Oct. 10, 1967
E. Z. GABRIEL
3,345,752
PRECISION TRIANGLE SOLVER, COMPUTER AND
CLASSROOM DEMONSTRATOR
Filed Aug. 30, 1965
3 Sheets-Sheet 1
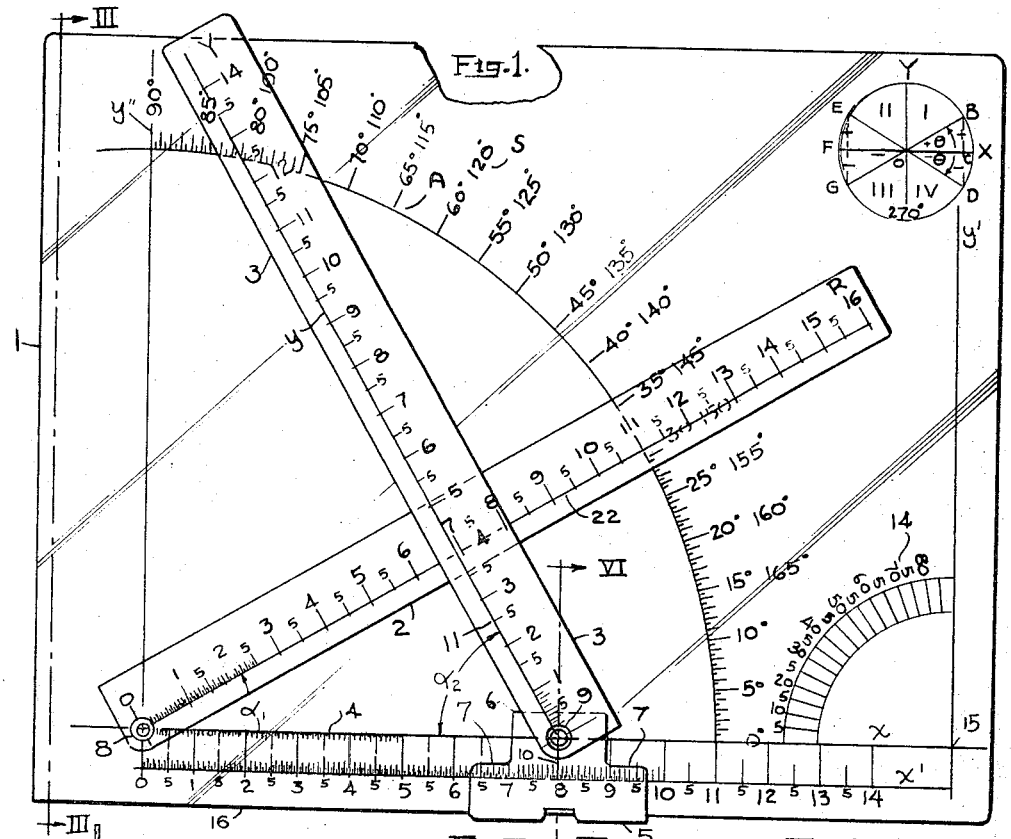
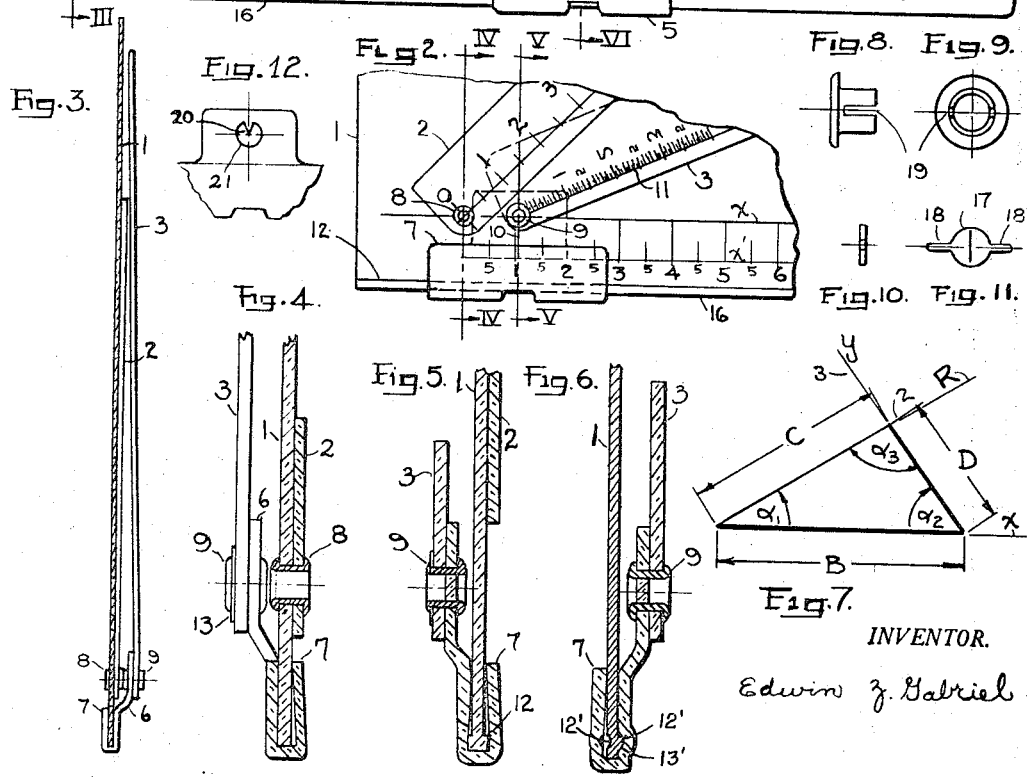
INVENTOR.
Edwin Z. Gabriel Oct. 10, 1967  E. Z. GABRIEL  3,345,752
PRECISION TRIANGLE SOLVER, COMPUTER AND
CLASSROOM DEMONSTRATOR Filed Aug. 30, 1965  3 Sheets-Sheet 2

*INVENTOR.*

BY  Edwin Z. Gabriel

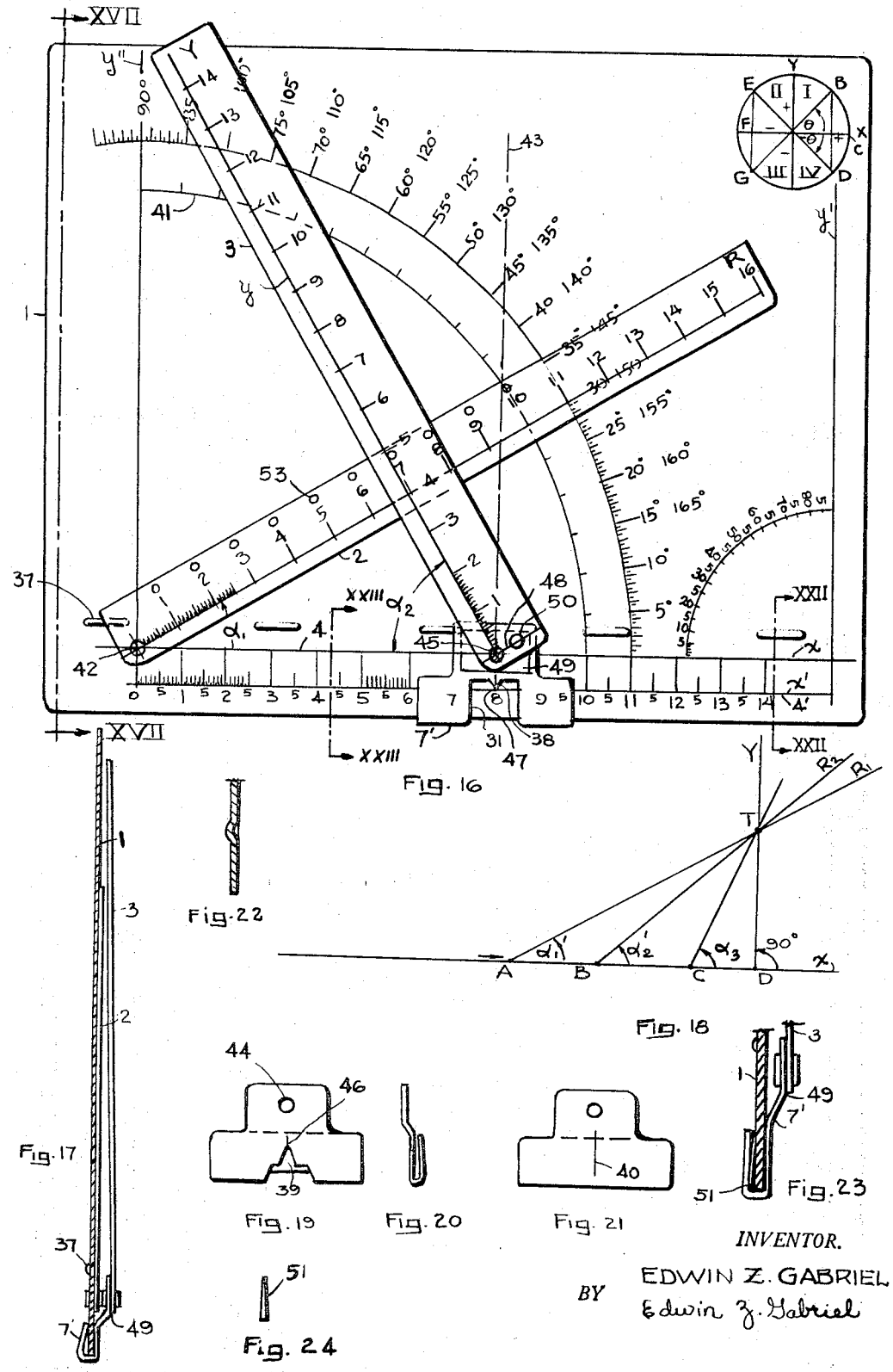

United States Patent Office 3,345,752
Patented Oct. 10, 1967

3,345,752
PRECISION TRIANGLE SOLVER, COMPUTER
AND CLASSROOM DEMONSTRATOR
Edwin Z. Gabriel, 91 Mount Tabor Way,
Ocean Grove, N.J. 07756
Filed Aug. 30, 1965, Ser. No. 492,961
6 Claims. (Cl. 33—97)

This application is a continuation-in-part of my pending application, Ser. No. 410,089 now abandoned. It relates to a manual type computer designed to solve problems met with in carpentry, construction work, mechanics, mechanisms, navigation, mathematics, physics, electrical engineering circuits and in automatic control systems calculations, examples of which may be conversion of complex numbers from polar to cartesian coordinates and vice versa, in addition to multiplication, division and vector problem solving.

The computer may be of a size to fit into a loose-leaf binder and still give readings which may be of corresponding accuracy as with those from a ten inch Manheim slide rule, so that it may be used in conjunction with a slide rule by interchange of readings from one to the other with equal dependability.

A computer is provided by this invention capable of quickly checking results of trigonometric problems, initial solutions of which have been made by some other more tedious method.

A further object of this invention is to provide a mechanical structure usable for laying out work and solutions with delineations at desired angles and prescribed lengths.

In a broad aspect, the invention may be said to provide a structure which will physically designate lengths of sides and angles of triangles; and if sufficient information is provided to solve the problem mathematically, this computer will solve it more quickly graphically to provide a direct reading of either or both of unknown lengths and angles.

This instrument also could assist one in learning the principles of addition, subtraction, multiplication, division, plane geometry, trigonometry, physics, and mechanics. It could also assist the user in making drawings to scale without effort.

The high school student upon graduation can later on use this computer in technical courses in higher education, principally in electrical engineering courses. Afterwards he can use it in his work.

It is a further objective to place a transparent model or version of this computer on an overhead projector so that an entire class of students can see the instructor performing the steps to the solution of a problem, and thus, the learning process can be accelerated. In using this computer, the user does not lose sight of the mathematical principles involved. For example, in trigonometry he is constantly being reminded of the relationship of the sides of the angles of triangles.

Other objects, advantages and novel features contemplated in the invention will appear to persons skilled in the art to which it appertains as the description proceeds, both by direct recitation thereof and by inference from the context.

Referring to the accompanying drawings, in which like numerals of reference indicate similar parts throughout the several views:

FIGURE 1 is a plan view of a computer, showing the movable members making angles less than 90° with the base member or plate, for solution of oblique triangle problems, and the movable members include a rider having sliding engagement with an edge of the plate;

FIGURE 2 is a partial plan showing the same rider inverted, or in reverse, so that the back side of the rider shown in FIG. 1 is now located on the front side of the computer, and FIG. 2 further shows modification of the edge margin of the plate and engaging portion of the rider;

FIGURE 3 is a vertical section on line III—III of FIG. 1;

FIGURE 4 is an enlarged partial section on line IV—IV of FIGURE 2, showing the solely pivoted member eyeletted to the base member, and the folded-over portion of the rider being closed in at the top to provide the necessary resilient friction when assembled with the base member;

FIGURE 5 is an enlarged partial section on line V—V of FIG. 2, showing the translational movable rider member eyeletted to the Y-scale member, but showing in addition, a bulge or riser along the computer's edge.

FIGURE 6 is an enlarged partial section of a modification utilizing opaque materials and taken on line VI—VI of FIG. 1, the modification includes an indentation, crease or crimp just above the computer's base edge to enable the rider to stay in position at all times;

FIGURE 7 is a line diagram of the triangle formed by the x, y and R hairlines of the computer;

FIGURE 8 is a side view of the eyelet for connecting Y-scale arm to the rider;

FIGURE 9 is a plan view of said eyelet;

FIGURE 10 is a side view of window pane for retention of the eyelet;

FIGURE 11 is a plan view of said window pane.

FIGURE 12 is a partial plan of the rider showing a modification of the hole.

FIGURE 16 is a plan view showing both indentations in the base plate near and parallel to the bottom edge and an opening or window in the front face of the rider.

FIGURE 17 is a vertical section on line XVII—XVII of FIG. 1.

FIGURE 18 is a line diagram of a triangle formed by the x, y, and R hairlines of the computer.

FIGURE 19 is a plan view of the rider showing an opening with a pointer directed upward to indicate said rider's position along the x-scale.

FIGURE 20 is a side view of the rider shown in FIG. 19.

FIGURE 21 is a plan view of a rider without an opening but with a hairline to indicate its position along the x-scale.

FIGURE 22 is a partial vertical section on line XXII—XXII to show a side view of the indentation in the plastic or other suitable material.

FIGURE 23 is an enlarged partial section on line XXIII—XXIII to show a side view of a resilient strip adhered lengthwise along the rear side of plate 1 near the bottom edge.

FIGURE 24 is an enlarged side view of a strip adhered to the reverse side of plate 1 near the bottom edge.

Figure 13:
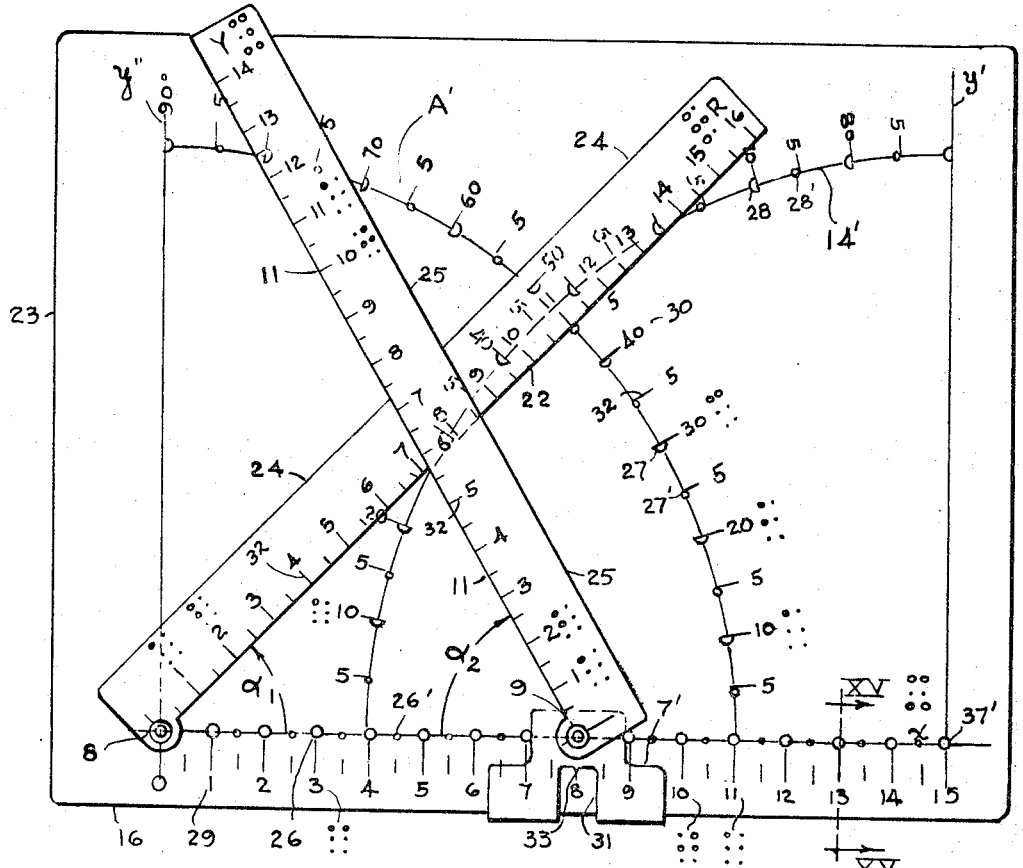
FIGURE 13 is a plan view of a computer showing the modification to the plan view of FIG. 1 as an aid to enable a blind person to learn trigonometry and to solve problems involving vectors.

In the specific embodiment of the invention illustrated in said drawings, the reference numeral 1 in FIGURES 1, 2, 3, 4 and 5 designates a basal plate of suitable size, shape and material, here shown as substantially rectangular and preferably comprised of a moderately rigid transparent sheet of plastic or the like, or it could be an opaque sheet as well. In conjunction with this basal plate or sheet, there are provided three linear scale members 2, 3, and 4, of which 4 extends along the bottom margin and is fixed with respect to and located at the upper face of said basal plate. It provides a longitudinal x-scale with traversing scale markings of small increments of length, such as shown in the first two and a half main divisions of the three linear scales of FIGURE 1. The scale markings begin at the left with the extension of the vertical line through the eyelet as the zero location. For aid to the user, the main division markings have associated number readings successively from zero to the maximum number of divisions, zero to fourteen, or other chosen maximum. All distances between each main division are equal to each other. In the supplied specimen, the main divisions are ⅝" apart, making the subdivisions 1/16" apart, and the sub-subdivisions 1/32" apart.

The above mentioned scale member 3 constitutes a Y-scale member with a graduated hairline y thereon, is of transitional character, being mounted both to be swung and to be translationally movable, and thus capable of change in angularity with respect to, and change in, its location along fixed x-scale member 4. As used herein, translational location or movement refers to selected positioning without a change of angularity, while transitional movement designates either a translational or an angular movement or both. Transitional mounting for scale member 3 is shown as accomplished in all FIGURES 1, 2, 3, 4, 5, and 6, by a mounting assembly or rider 7, having the form of a T-head with a resilient folded-over portion and providing a leg 6 of flat, transparent material, an end margin of which overlaps the bottom edge of scale member 3 in flat-wise relation thereto, so that a pivot means 9, in the form of a rivet or its equivalent, may be passed through the overlapping portions and thereby secure the scale member pivotally to said leg. Considering the mounting assembly or rider 7 in its entirety, there is a leg 6 projecting transversely from T-portions 6, which may be conveniently designated as the foot; and it will be observed that the botom of said foot has a folded-over portion with the bottom of said fold-over forming a straight edge perpendicular to a hairline 10 on leg 6. The rider thus constructed may be used either face up on the upper face of the basal plate as shown in FIGURE 1, or be face up on the reverse side of the basal plate as shown in FIGURE 2. The latter position of rider 7 is desirable when a hairline 11 of a Y-scale member 3 must be positioned at an acute angle, an angle less than 90°.

No matter on which side of the basal plate member 1 rider 6 is positioned, the recess forming a straight edge of the folded-over portion will be in longitudinal slidable engagement with the straight edge of the fixed scale member 4, or with the straight edge of any of the other sides of said rectangular plate 1.

Indicia line $y'$ from the pivotal center of the smaller arc extends to the $x'$-scale hairline and is perpendicular thereto for translational location of rider 7 and to enable and assure that scale member 3 will be perpendicular to the x-scale when so desired.

As the foot of rider 7 is slid along in contact with the straight edge of member 1, the center or axis of pivot 9 will move along line x in parallelism to said straight edge and longitudinal scale line $x'$. The pivoted and transitionally movable scale member 3 has a longitudinal hairline y extending longitudinally thereof from the pivotal center to the outer end of said member and is located medially between the side edges or is as shown to one side of said member and with traversing scale markings corresponding in spacing and numerical indicia to the spacing and indicia of the fixed x-scale markings so as to afford like readings of length. This longitudinal hairline y and its associated markings will be referred to as the Y-scale. The zero end of said Y-scale thus provided starts at the center of pivot 9, and the scale length may be made to meet the demands of use, and here shown as sufficient to provide sixteen main divisions. Preferably scale member 3 is made of a transparent material and the scale and other markings are inscribed on what is normally the under face of said member so as to minimize parallax in making readings on another scale appearing thereunder in use.

To enable accurate reading along the x-scale, a window pane 17 is fitted into a smiliar shaped opening provided in rider 7. As shown, the window pane contains a vertical hairline. Eyelet 9 has two slots 19, shown in FIGURES 8 and 9 to permit said eyelet to straddle projections 18 extending from window pane 17. Projections 18 prevent the eyelet from rotating or turning with respect to the rider. The eyelet rides over hairline of x-scale and enables accuracy of registration. When the graduations are located along the $x'$ line only, window pane 17 of FIGURE 11 would be unnecessary, and then eyelet of FIGURE 8 would not require slots 19.

In order to maintain the transitional member 3 at whatever angle it is set for, suitable frictional retaining means are provided, such as a tightly held eyelet or a transparent spring washer 13 indicated in FIGURE 4 as applied to eyelet 9 under head thereof and against the proximate face of leg 6 of rider 7.

The third scale member 2 is pivoted only, and is not translationally movable. Pivoting means, such as eyelet 8, attaches this solely swingable member 2 directly to the top face of basal plate 1, the center or axis of said pivot being directly above the zero marking of the fixed $x'$ scale and on line x. The solely swingable member 2 is provided with suitable frictional retention for the purpose of maintaining it at any angular position to which it is set, which may be accomplished by predetermined tightness of eyeletting or by a spring washer as above described for pivot 9, or otherwise. Said solely swingable member 2 has what will be herein designated as an R-scale comprising a longitudinal medial hairline 22 with traversing scale markings corresponding in spacing and numerical indicia to the spacing and indicia of the other two scales. Said solely swingable member 2 also is transparent. The hair-line 22 and other scale markings forming the R-scale on this swingable member 2 are more desirably on the upper face thereof so as to avoid parallax with the markings of the transitionally movable member 3, which in normal intended use overlies it. The zero marking of this R-scale registers with the axial center of pivoting of solely swingable member 2, and the length of member 2 and number of markings may accord with the wishes of the maker.

Centered on the pivoting axis of pivot 8 for the swingable scale member 2 and inscribed on the top surface of basal plate 1 is an arcuate scale, for convenience designated the A-scale, having transversal divisional markings representing a quadrant of degrees starting at zero at the intersection with line x so that the 90° transversal marking will be upon a line $y''$ perpendicular to line x and crossing that line at the center of curvature of said arcuate A-scale. An angle $\alpha$, between the hairline R of the swingable member 2 and the line x may be made directly by swinging the said member to the corresponding reading of angle in degrees on the A-scale. In FIGURE 1, desired angle $\alpha$, between the line x and translational member 3 also is made with respect to the same arcuate A-scale by first locating the pivotal axis of that member in coincident alignment with the pivotal axis of the solely swingable member, so as to be at the center of the A-scale arc.

If an interior acute angle is desired and if the base is transparent, the rider assembly may be inverted as shown in FIGURE 2, in which position the user would see the Y-scale in reverse. By having pivot 9 center coincide with center 8, member 3 may be adjusted to the desired obtuse angle and then moved or slid to the desired position on the $x'$ scale. If member 1 is not transparent, then rider 7 may remain right side up and its pivot 9 center be made to coincide and register axially with pivot center 8, for adjusting member 3 to the desired angle on supplementary arcuate scale S, or arcuate scale A may be extended to 180°, whichever method appears to be the more practical one for the manufacturer of this computer. The problem with the former method is that the rider leg 6 and eyelets 8 and 9 must be designed for a minimum amount of interference when one is located on top of the other, as they appear to be in FIGURE 3.

With the structure of FIGURES 1 to 6, for any angle other than 90°, the rider 7 with scale member 3 can be turned upside down or reversed as shown in FIGURE 2, after which the axes of the eyelets are aligned, and for an acute angle, member 3 is placed rotatably over the corresponding degree reading of arcuate A-scale, after which the mounting may be turned over to its normal side up, whereupon angle $\alpha_2$ is located as an interior acute angle. If the basal plate is not transparent but opaque, then smaller arcuate scale 14 may be used for adjusting member 3 to an acute angle $\alpha_2$ after positioning rider 7 so that the center of its eyelet coincides with center 15. Should an obtuse angle be required, the angle set with said rider assembly right-side up and the axes of eyelets 8 and 9 aligned will be the number of degrees in the obtuse angle in excess of 90° or the number of degrees less than 180° as read on the supplementary scale of the A-scale. Then, without any turning in reverse, rider 7 is merely slid along edge 16 to the desired position with respect to the $x'$-scale where it would present the desired interior obtuse angle. With the construction shown, right side of base member may be lengthened to enable arc 14 to contain 180° of arc, so that said obtuse angle of member 3 may be made using this smaller scale. Also, left side of base member may be lengthened so that this additional margin may be bent over flat so as to enable the upper end of member 3 to be held in place in the pocket formed when not in use.

It has been mentioned that a window pane 17 be fitted inside eyelet 9. Another construction to enable accurate reading of the $x$-scale is provided by the pointed projection 20 in hole 21 of rider 7 shown in FIGURE 12. A slot 19 in eyelet of FIGURE 8 is sufficiently wide to permit the width of said projection 20 to pass through said slot without interference. Here pointed projection 20 indicates the relation of center of eyelet to the $x$-scale without the need of a hairline, as shown in the construction of FIGURE 11.

This proposed construction of the triangle solver has the advantage of compactness. With a transparent base sheet, one can utilize the same large angular arc for setting the transitional scale member to the desired angle with respect to base line $x$ by simply removing rider assembly and replacing it on the reverse side of the basal sheet. The desired angular adjustment of member 3 can be made on this reverse side and then this assembly can be replaced right side up as before. Thus, the arcuate scale need not extend beyond the 90°. For angles and sides of triangular configurations which occur in other quadrants than the first, one need only refer to the quartered circle which appears on the upper right corner of the basal member for the proper signs to the projections of the sides in question. The letters on said quartered circle would assist a teacher in identifying the right triangles and angles formed by the various members and scales of the computer to others.

In addition, the eyeletted T-square or Y-scale member has its base clamped onto an edge of the base sheet instead of being a loose member as in other designs of this type of computer. Using the added feature of either a basal edge with a riser (either as an integral part or as an addition to the edge), as in FIGURE 5 or one with an indentation lengthwise across the sheet just above the edge as in FIGURE 6, the folded-over portion of rider 7 can keep scale member 3 in place even while the computer is being moved about.

The structure as shown with an eyeletted transitional scale member 3 will enable one to solve an oblique triangle whenever any of the following angles and sides are known:

(1) Two angles and a side;
(2) Two sides and an angle;
(3) Three sides.

In the case of condition 3 in the preceding paragraph, there may be a slight amount of trial and error involved to obtain the unknown angles, and this will be explained later.

CASE 1

*Given.*—Length B, angles $\alpha_2$ and $\alpha_3$.
*Required.*—Lengths C and D.
*Note.*—$\alpha_1 = 180 - (\alpha_2 + \alpha_3)$.
*Solution.*—Adjust member 2 to angle $\alpha_1$. Slide rider to given length B on the $x$-line. Adjust arm 3 to make angle $\alpha_2$ with line $x$. Now obtain both lengths C and D by reading scales R and Y respectively at point of intersection of the two hairlines.

CASE 2A

*Given.*—Lengths B and C and angle $\alpha_1$.
*Required.*—Angle $\alpha_2$ and length D.
*Solution.*—Adjust member 2 to make an angle $\alpha_1$ with line $x$. Slide rider to given length B along line $x$. Adjust arm 3 to make such an angle with line $x$ that its hairline crosses hairline R of member 2 at known distance C. Read angle $\alpha_2$ on arc A and distance D along Y-scale.

CASE 2B

*Given.*—Lengths B and C and angle $\alpha_2$.
*Required.*—Angle $\alpha_1$ and length D.
*Solution.*—Move rider to given length B along $x$-scale. Adjust arm 3 to make angle $\alpha_2$ with line $x$. Now rotate arm 2 until its hairline crosses hairline of member 2 at known length C. Now unknown angle $\alpha_1$ and side D can be read off the computer, as previously described.

CASE 2C

*Given.*—Lengths B and C and angle $\alpha_3$.
*Required.*—Length D and angles $\alpha_1$ and $\alpha_2$.
*Solution.*—Orient triangle so that length C appears as its base along line $x$. Now adjust member 2 until its hairline makes angle $\alpha_3$ with line $x$. Move rider along $x$-scale to position denoted by given length C. Adjust member 3 until its hairline crosses hairline of member 2 at known length B. Unknowns length C and angle $\alpha_1$ now may be read off the computer, in the manner previously described.
*Note.*—$\alpha_2 = 180° - (\alpha_1 + \alpha_3)$.

CASE 3

*Given.*—Lengths B, C, and D.
*Required.*—Angles $\alpha_1$, $\alpha_2$, and $\alpha_3$.
*Solution.*—Slide rider along $x$-line to position denoted by given length A. Now gradually converge on the desired point of intersection by adjusting members 2 and 3, one at a time, until their hairlines cross at such a point as to provide the given lengths B and C. When this point is found, and this should take only but a minute, then previously unknown angles $\alpha_1$ and $\alpha_2$ may be read off in a manner described previously.
*Note.*—$\alpha_3 = 180° - (\alpha_1 + \alpha_2)$.

Another application of this type of computer could be to assist in teaching blind persons a knowledge of trigonometry. For this application either raised or recessed Braille numerals could be used and these could appear closer to the inside edges of the triangle formed by members 2 and 3 than the numerals shown in FIG. 1. Then hairlines 22 and 11 would coincide with said inside edges. In addition, indentations could exist along said edges, one for each main division graduation, so that a blind person could feel the exact location of the numeral of a particular scale. When one member crosses a second one in between two indentations, he should be able to approximate the location of the crossing by taking the ratio of the distance to the next lower indentation to the distance between adjacent indentations.

To be more specific concerning the description and operation of this type of computer by blind persons, refer to FIGURE 13. It will be apparent to the observer that certain parts of the original plan view, FIGURE 1, have been modified to permit blind persons to finger and read the linear scales $x$, Y, and R and the arcuate scales A and 14. In FIGURES 13, scale A' corresponds to scale A and larger scale 14' corresponds to 14. It will be noticed when comparing the two said figures that in the R-scale member the inside edge coincides with hairline 22. The graduations 32 on said member are either raised or recessed and the numerals are in both Braille and Arabic. The Arabic numerals permit a sighted child to use this computer, too. Similarly, for the Y-scale member 25, inside edge coincides with hairline 11. Again graduations 32 are either raised or recessed, with both Braille and Arabic numerals alongside, raised or recessed as well. For the $x$-scale, both graduations and circular holes 26 exist, one for each main division, to enable a blind person to properly position a rider 7' along its length. The larger circular holes 26 enable a blind person to insert cylindrical portion 35 of a stylus through both eyelet 9 and one of holes 26 for a whole integer. For the graduations 26' half way in-between, thinner cylindrical portion 34 of said stylus 36 is used. As shown, the numbers of $x$-scale are given in Arabic, but Braille numbers may be substituted, when the user is blind. The Braille numbers may be recesses, holes or projections on the face of the material alongside of which scale graduations exist.

Comparing the two FIGURES 1 and 13 again, the main difference between rider 7' and rider 7 is the opening 31 to enable a blind user to finger the Braille numeral directly below the larger holes 26 or the raised graduation half way in between to ascertain base length of a triangle along the $x$-scale. In this construction it will be difficult for the blind user to approximate the positions of said eyelet 9 at other locations than those where holes or graduations exist.

Figures 14, 15:
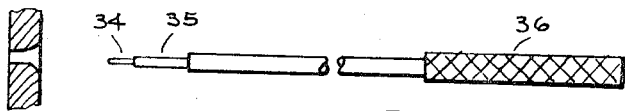
FIGURE 14 is a side view of a cylindrical stylus.
FIGURE 15 is an enlarged section of a hole, showing the contour along line XV—XV.

For arcuate scale A', holes 27 exist at ten (10) degree increments to aid in angularly positioning R-scale member 24. For said 10 degree increments, identified by arabic numerals 30, portion 35 of stylus 36 is used to enable positioning of said member 24. For the half way in-between holes 27' portion 34 of said stylus is used. Here only the first digit of the angle need be given in the Braille numbering of angles. The second digit will be assumed to be zero (0). Similarly, to angularly position Y-scale member 25, arcuate scale 14' is available. Here larger holes 28 exist for the ten (10) degree increments and smaller holes 28' are available for the graduations in-between. Now to adjust member 25 to the desired angle $\alpha_2$, rider 7' is slid to location 15 on $x$-scale. Then stylus portion 35 is inserted through both hole in eyelet 9 and hole 37', aligning said rider 7' so that said eyelet centers on hairline $y'$. Next stylus 36 is inserted in a desired hole of said arc 14' and hairline 11 is brought down against said stylus. Leaving member 25 in position, and with stylus removed from said hole, similarly adjust hairline 22 of member 24 to desired angle $\alpha_1$. If interference of member 24 with member 25 occurs when making these adjustments, member 25 may be removed or slipped off from base sheet 23, before adjusting member 24 to the desired angle. Then said member 25 may be slipped back onto said sheet 23. An alternative design, to avoid having to slip member 24 from said sheet, is to make said sheet sufficiently long to avoid any interference of the said two members 24 and 25, when making these angular adjustments. Finally, to solve the triangular problem, said rider of said member 25 is positioned in translation along edge 16. It should be noted here that to enable stylus 36 to slip into desired hole position with ease, the top portions of all holes should be larger and sloping down to the desired diameter as shown in FIGURE 15. In addition, in order to use the design of said stylus 36 as shown in FIGURE 14, it is desirable that sheet 23 be made rigid and that it be propped up on a frame so that said portion 35 will reach down or penetrate to the larger size of said holes 26, 27, and 28. Said frame should keep edge 16 free for movement of rider 7'. Sheet 23 need not be propped up on a frame when the computer is being used by a sighted person as stylus 36 would now be unnecessary.

The side or edge views of said computer shown in FIGURE 13 would be similar to those shown in FIGURES 3 and 6 taken along similar lines III—III and VI—VI. Since base sheet 23 would be opaque for this application, there is no need to place rider 7' on the reverse side of said sheet as shown in FIGURE 2 and, therefore, FIGURES 4 and 5 would not apply here.

In operation by a sighted person, this version of the computer would be used in the same manner as the configuration represented by FIGURE 1 for solving oblique triangular problems.

Several differences exist between the plan views shown in FIGURES 1 and 16. Two obvious differences are the indentations in the base sheet material running parallel with the bottom edge and the opening or window in the rider. The said indentations cause protrusions to occur along the reverse side of the base sheet and enable it to be sufficiently elevated to allow the rider to move freely along the bottom edge without its bottom face making frictional contact with the surface upon which it is resting. For example, for a .030″ or .025″ thickness material for the rider, the indentations should protrude .030″ above the rear surface of the base sheet.

The indentations, whether they be circular in shape or elongated as shown in FIGURE 16, can be formed by means of a forming die set which would press the plastic material into the desired shape. Less labor would be required as well as the result being neater in this sort of a process than in cementing circular or elongated pieces of material onto the rear side of the base sheet to produce the same beneficial effect. For a heavy rigid material three equally-spaced indentations may suffice while for a flexible sheet of .030″ thickness five indentations as shown, might be necessary for free movement of the rider.

The riders shown in FIGURES 16 and 19 can be either of opaque or of transparent material, while the riders of FIGURES 1 and 21 must be of transparent material. In these figures it is desirable to have the hairline 40 imprinted on the reverse of the top side of the rider to reduce parallax.

The graduated arc 41 having a radius of ten main divisions from center 42 enables one to obtain sines and cosines of angles with the aid of the R-scale member. For example, if the $y$-scale were rotated to a vertical position so that its hairline were at right angles with the $x$-scale, then the cosine of 36.9° would be 8/10 and the sine of 36.9° would be 6/10. Since the arc's radius is ten (10), the R-scale member will be unnecessary, although its use would be helpful for a more accurate evaluation of the smaller angles wherein the arcuate scale makes a steep angle with the $x$-scale. The addition of arc 41 should make this computer more helpful for teaching trigonometric functions to a beginner's class, as the pupils can see at a glance the ratios of which sides are being used to give the desired functions of angles. Line Y' enables the user to check the verticality of the $y$-scale member when forming right triangles with the $x$, $y$ and R hairlines, although line 48 can be used when the formation of a right triangle is not too critical.

In the fabrication of rider 7, its flat form can be punched out using a steel rule or equivalent die. Either opening 31 or 39 could be punched out at the same time. An opening or cut-out in the rider as shown would be advantageous for accurately locating hole 44 or 45, with the aid of a fixture, since its exact location is necessary for the precision instrument. The folded-over rider would be placed over and against a fixture which would always position the rider to be pierced in the same exact location both transversely and vertically with respect to pointer 46 or 47 by the worker. Thus, when member 3 is eyeletted to rider 7, the center of eyelet will align with both the pointer tip and the x-hairline. The hairline could be imprinted on the reverse side of the rider material from reference or guide marks prior to the time when the material is either punched out or cut out. If cast, the hairline could be formed during the casting operation from a mold.

To solve a problem in navigation, refer to FIGURE 18. This is one of many such problems which this type of computer can solve. FIGURE 18 involves the solution of a triangle formed by two bearings, angles $\alpha_1'$ and $\alpha_2'$ on a single object, such as a lighthouse, and the "run" AB between them. The object of this computation is to find minimum distance DT assuming the direction of course shown by arrow. Using this graphical computer, one finds the solution as follows. (Angle $\alpha_3$ is a third bearing which might be taken along the direction of course.)

(1) Adjusted R hairline of computer to form given angle 26° ($\alpha_1'$).

(2) Superimpose origin of Y-scale over origin of arcuate scale, and adjust hairline of Y-scale to form angle of 51° ($\alpha_2'$) with the x-axis.

(3) Slide rider containing origin of y-scale hairline to position B, while maintaining angle $\alpha_2'$.

(4) Note length along R-scale hairline AT where hairlines of R and Y scales cross.

(5) Now make the Y-scale hairline perpendicular with the x-axis and slide foot of y-member until its hairline intersects the R-hairline at precisely the same point C.

(6) Finally read off length along the Y-scale hairline DT. For AB equal to 1 unit, length DT equals 0.81 unit.

Because of fewer round-off errors, this computer is likely to give a more accurate distance than Table 7 of Bowditch as found in Dutton's "Navigation and Piloting" book. A pilot of a ship may wish to take additional bearings along the direction of course to check his results, and a third position C is shown in FIG. 18 for this purpose. The procedure for obtaining distance DT would be the same.

A flat resilient material 49, shown in FIGURES 16 and 17, adhered to upper top surface of rider 7, keeps Y-scale member 3 in whatever position to which it is adjusted. It is preferably that this material 49 be transparent, so that when the R-scale is close to the horizontal position, the R-scale graduations can be seen and read through the upper portion of the rider. The membrane or material could be smaller and circular in shape.

A flat resilient strip or one shaped as shown in edge view, FIG 24, placed lengthwise near the bottom of and on the reverse side of said basal plate member 1 and parallel to edge 16 assists in retaining said rider 7' in the desired position along said x-axis and against said edge 16.

Circular magnet 50 is imbedded in Y-member 3 of FIG. 16, and rider 7' is of a material to which said magnet is attracted. Thus, magnet 50 helps to retain hairline y of member 3 at the desired angle with respect to horizontal hairline x, when computer is displayed, for example, before a classroom.

What is claimed is:

1. A computer for solving triangles, comprising a flat sheet-like basal plate having an arcuate graduated scale of at least 90° thereon described about a center on said basal plate, said basal plate having straight horizontal and vertical side edges and an x-line with an x-scale extending across the same passing through said center at its zero reading and graduated to read from left to right and providing a straight edge margin, parallel with the bottom edge of said plate, movable arm means solely pivotally fixed to said basal plate at said center and having a free end part extending across said arcuate scale, said arm means including a longitudinally extending graduated scale, a rider having a foot comprising a folded-over part in the form of a guide channel engaging against and over said bottom edge of said basal plate with air space between said folded-over part and said plate, said folded-over part providing longitudinal guiding engagement with said bottom edge of said basal plate, and providing manually slidable gripping engagement with said basal plate proximate to said bottom edge, a swingable and translational y-scale member pivotally mounted on said rider at same distance from said bottom edge as said x-line of x-scale and in normal position projecting over the face of said rider across said solely pivoted arm means, said y-scale member having a longitudinally extending scale thereon and a vertical y-hairline, said y-hairline passing through said center and being perpendicular to said x-line when the pivotal connection of the rider and y-arm is directly positioned over the pivotal connection of the arm means to the basal plate, wherein the portion of said plate beneath said bottom edge has a resilient strip lengthwise thereof to retain and slidably grip said rider against said straight edge.

2. A computer for solving triangles, comprising a flat sheet-like basal plate having an arcuate graduated scale of at least 90° thereon described about a center on said basal plate, said basal plate having straight horizontal and vertical side edges and an x-line with an x-scale extending across the same passing through said center at its zero reading and graduated to read from left to right and providing a straight edge margin, parallel with the bottom edge of said plate, movable arm means solely pivotally fixed to said basal plate at said center and having a free end part extending across said arcuate scale, said arm means including a longitudinally extending graduated scale, a rider having a foot comprising a folded-over part in the form of a guide channel engaging against and over said bottom edge of said basal plate with an air space between said folded-over part and said plate, said folded-over part providing longitudinal guiding engagement with said bottom edge of said basal plate, and providing manually slidable gripping engagement with said bottom edge of said basal plate proximate to said bottom edge, a swingable and translational y-scale member pivotally mounted on said rider at same distance from said bottom edge as said x-line of x-scale and in normal position projecting over the face of said rider across said solely pivoted arm means, said y-scale member having a longitudinally extending scale thereon and a vertical y-hairline, said y-hairline passing through said center and being perpendicular to said x-line when the pivotal connection of the rider and y-arm is directly positioned over the pivotal connection of the arm means to the basal plate, wherein the portion of said plate beneath said straight bottom edge has a resilient strip adhered lengthwise thereof to retain and slidably grip said rider against said straight edge.

3. A computer for solving triangles, comprising a flat sheet-like basal plate having an arcuate graduated scale of at least 90° thereon described about a center on said basal plate, said basal plate having straight horizontal and vertical side edges and an x-line with an x-scale extending across the same passing through said center at its zero reading and graduated to read from left to right and providing a straight edge margin, parallel with the bottom edge of said plate, movable arm means solely pivotally fixed to said basal plate at said center and having a free end part extending across said arcuate scale, said arm means including a longitudinally extending graduated scale, a rider having a foot comprising a folded-over part in the form of a guide channel engaging against and over said bottom edge of said basal plate with air space between said folded-over part and said plate, said folded-over part providing longitudinally guiding engagement with said bottom edge of said basal plate, and providing manually slidable gripping engagement with said basal plate proximate to said bottom edge, a swingable and translational y-scale member pivotally mounted on said rider at same distance from said bottom edge as said x-line of x-scale and in normal position projecting over the face of said rider across said solely pivoted arm means, said y-scale member having a longitudinally extending scale thereon and a vertical y-hairline, said y-hairline passing through said center and being perpendicular to said x-line when the pivotal connection of the rider and y-arm is directly positioned over the pivotal connection of the arm means to the basal plate wherein said pivot for said y-scale member comprises an eyelet through said y-scale member and said rider constituting a pivot mounting said member on said rider, a transparent pane with a hairline applied diametrically to said pane, said pane provided in said eyelet and adapted to locate said member with respect to said x-scale, and wherein said pane is provided with at least one projection and said member arm has at least one notch cut out to receive said projection to retain said pane nonrotatable in said eyelet.

4. A device of the character described comprising a transparent basal member having upper and under flat faces and having a straight bottom edge and an x-scale with a zero reading included in parallelism thereto with a margin of said basal member between said x-scale and edge, a rider having slidable engagement against said straight edge and slidably gripping the said basal member at said margin thereof between said straight edge and x-scale, and applicable either side up to said margin and edge, a swingable and translational y-scale member pivotally mounted on and translationally movable with said rider at the upper said face of the basal member when the rider has one side up and at the under face of said basal member when the rider has its other side up, and, whichever side of the rider is up, the pivot center for said y-member is at a same constant distance from said straight bottom edge, a solely pivoted R-scale member having its pivot center fixed on said basal plate on said upper face thereof at a distance from said straight edge the same as said constant distance of the y-scale pivot from said straight bottom edge and on a line perpendicular to said x-scale from said zero reading of said x-scale, and an arcuate scale on said basal member upper face centered thereon at said pivot center of said solely swingable R-scale member, wherein said rider has a foot comprising a folded-over part in the form of a guide channel engaging against and over said bottom edge, said folded-over part having an inside front face and an inside rear face, wherein said inside front face of said folded-over part of said rider has a groove lengthwise thereof parallel to said selected side edge and said upper face of said plate has a projection lengthwise thereof positioned to receive said groove of said folded-over part, and wherein said inside rear face and a corresponding portion lengthwise across said underface of said plate having confronting recesses.

5. A computer for solving triangles, comprising a flat sheet-like basal plate having an arcuate graduated scale of at least 90° thereon described about a center on said basal plate, said basal plate having straight horizontal and vertical side edges and an x-line with an x-scale extending across the same passing through said center at its zero reading and graduated to read from left to right and providing a straight edge margin, parallel with the bottom edge of said plate, movable arm means solely pivotally fixed to said basal plate at said center and having a free end part extending across said arcuated scale, said arm means including a longitudinally extending graduated scale, a rider having a foot comprising a folded-over part in the form of a guide channel engaging against and over said bottom edge of said basal plate with air space between said folded-over part and said plate, said folded-over part providing longitudinal guiding engagement with said bottom edge of said basal plate, and providing manually slidable gripping engagement with said basal plate proximate to said bottom edge, a swingable and translational y-scale member pivotally mounted on said rider at same distance from said bottom edge as said x-line of x-scale and in normal position projecting over the face of said rider across said solely pivoted arm means, said y-scale member having a longitudinally extending scale thereon and a vertical y-hairline, said y-hairline passing through said center and being perpendicular to said x-line when the pivotal connection of the rider and y-arm is directly positioned over the pivotal connection of the arm means to the basal plate, including a magnet, wherein said rider is constructed of material of which said magnet is attracted, said magnet being imbedded in said y-scale member adjacent to said movable pivot.

6. A computer for solving triangles, comprising a flat sheet-like basal plate having an arcuated graduated scale of at least 90° thereon described about a center on said basal plate, said basal plate having straight horizontal and vertical side edges and an x-line with an x-scale extending across the same passing through said center at its zero reading and graduated to read from left to right and providing a straight edge margin, parallel with the bottom edge of said plate, movable arm means solely pivotally fixed to said basal plate at said center and having a free end part extending across said arcuated scale, said arm means including a longitudinally extending graduated scale, a rider having a foot comprising a folded over part in the form of a guide channel engaging against and over said bottom edge of said basal plate with air space between said folded-over part and said plate; said folded-over part providing longitudinal guiding engagement with said bottom edge of said basal plate, and providing manually slidable gripping engagement with said basal plate proximate to said bottom edge, a swingable and translational y-scale member pivotally mounted on said rider at same distance from said bottom edge as said x-line of x-scale and in normal position projecting over the face of said rider across said solely pivoted arm means, said y-scale member having a longitudinally extending scale thereon and a vertical y-hairline, said y-hairline passing through said center and being perpendicular to said x-line when the pivotal connection of the rider and y-arm is directly positioned over the pivotal connection of the arm means to the basal plate, wherein said rider has a top surface and said y-scale member has an under surface and wherein a transparent resilient material surrounds said pivot of the translational member and is adhered to one of said surfaces, said material retaining said y-scale member in any preselected position relative to said x-axis.

References Cited

UNITED STATES PATENTS

| | | | |
|---|---|---|---|
| 1,032,493 | 7/1912 | Myers | 33—94 |
| 1,294,768 | 2/1919 | Carlson | 33—76 |
| 1,356,987 | 10/1920 | Ingle | 33—107 XR |
| 2,469,672 | 5/1949 | Wartinen | 235—61 |
| 2,701,096 | 2/1955 | Wattier | 235—61 |
| 3,083,901 | 4/1963 | Gabriel | 33—97 XR |
| 3,128,944 | 4/1964 | Gabriel | 33—97 XR |

FOREIGN PATENTS

| | | |
|---|---|---|
| 5,297 | 1888 | Great Britain. |
| 66,495 | 1/1893 | Germany. |
| 846,968 | 8/1952 | Germany. |

LEONARD FORMAN, *Primary Examiner.*

H. N. HAROIAN, *Assistant Examiner.*